(No Model.)
M. N. RANKINS.
CANT HOOK.
No. 392,752. Patented Nov. 13, 1888.
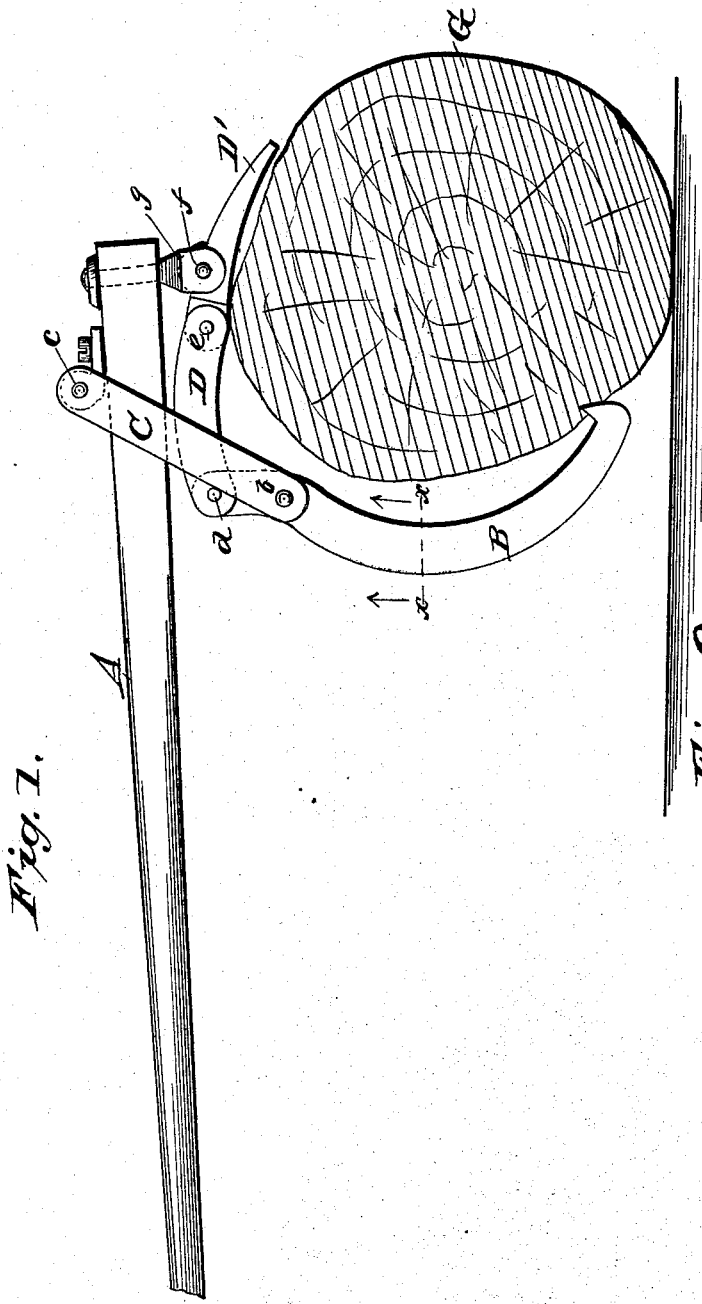
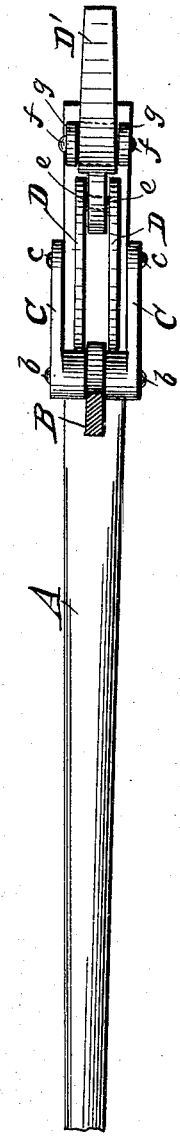
WITNESSES:
Phil C. Dieterich
E. M. Clark
INVENTOR:
M. N. Rankins.
BY Munn & Co.
ATTORNEYS.

UNITED STATES PATENT OFFICE.

MILTON N. RANKINS, OF WILLETTSVILLE, OHIO.

CANT-HOOK.

SPECIFICATION forming part of Letters Patent No. 392,752, dated November 13, 1888.

Application filed July 21, 1888. Serial No. 280,626. (No model.)

*To all whom it may concern:*

Be it known that I, MILTON NELSON RANKINS, of Willettsville, in the county of Highland and State of Ohio, have invented a new and useful Improvement in Cant-Hooks, of which the following is a full, clear, and exact description.

This invention relates to cant-hooks for rolling logs or turning heavy pieces of timber; and it consists in a certain articulated construction and novel combination of parts, substantially as hereinafter described, and pointed out in the claim, whereby a very firm hold, free from slip, is secured for the hook on the log or body to be rolled or turned, and a powerful action is obtained for the cant-hook.

Reference is to be had to the accompanying drawings, forming a part of this specification, in which similar letters of reference indicate corresponding parts in both the figures.

Figure 1 represents a side elevation of my improved cant-hook as applied to the rolling of a log; and Fig. 2, a horizontal section of the implement upon the line $xx$ in Fig. 1, looking upward.

A indicates the handle or lever of the implement, and B its hook proper. This hook B is double-pivoted, first, as at $b$, to the lower end of a strap, C, which is jointed or pivoted above, as at $c$, to the lever or handle A, near the forward end of the latter, and, secondly, as at $d$, above the pivot $b$ to the rear end of an articulated bar, D D′, having its sections pivoted together, as at $e$, and its forward section, D′, pivoted or fulcrumed, as at $f$, to the front end portion of the lever A, as by an eyebolt, $g$. By this articulated construction of the cant-hook, when the implement is placed in position on a log, G, with the hook proper, B, hanging downward, a slight upward movement of the lever A from the rear will bring the point of said hook up to the log and fasten it therein, so that it will be impossible for it to give way or slip, and the greater the upward pressure that is exerted on the lever the firmer will be the hold. The main or acting fulcrum of the lever will be at $f$, and the lifting-point of the hook through the strap or connection C be at $c$; but the articulated bar or connection D D′ will be brought beneath its pivots $ef$ down on or over the log, and the tendency to flex said jointed or articulated connection D D′ as the lever or handle is worked to turn or roll the log will exert a backward thrust on the pivot $d$ of the hook, which will exert a tendency to turn the hook on its pivot $b$ and cause the point of the hook to sink deeper or firmer into the log and the articulated connection D D′ to bear down securely on the log.

Having thus described my invention, what I claim as new, and desire to secure by Letters Patent, is—

The combination of the lever or handle A, the hook proper, B, the link or connection C between said handle and said hook, the pivots $b\,d$, and the articulated bar or connection D D′, fulcrumed or pivoted to the lever, as at $f$, and having its sections jointed or pivoted together, as at $e$, back of the fulcrum or pivot $f$, substantially as shown and described.

MILTON N. RANKINS.

Witnesses:
D. S. HAYS,
W. E. RIDGWAY.